April 23, 1940.                R. S. BRESCKA ET AL                2,197,757
                                      GAUGE
                              Filed March 10, 1938
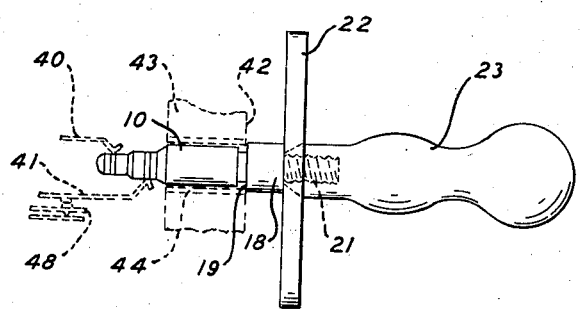
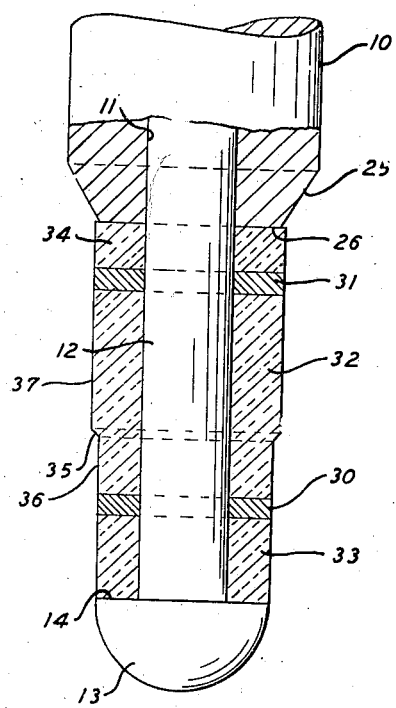
INVENTORS
R. S. BRESCKA
E. J. MEAGHER
BY
E. R. Nowlan
ATTORNEY Patented Apr. 23, 1940

2,197,757

UNITED STATES PATENT OFFICE 2,197,757

GAUGE

Rudolph S. Brescka, Cranford, and Edward J. Meagher, Westfield, N. J., assignors to Western Electric Company, Incorporated, New York, N. Y., a corporation of New York Application March 10, 1938, Serial No. 195,006

5 Claims. (Cl. 179—175.1)

This invention relates to a gauge and more particularly to a plug gauge for testing electrical apparatus.

In the manufacture of switchboards, particularly those in the art of telephony, it is necessary to provide each switchboard with a multiplicity of switches, each of which includes a spring jack which may be moved to complete a circuit or circuits through the aid of a plug. In order to determine whether or not the springs of the jacks are positioned accurately they are tested by means of a gauge patterned after the switch plugs which will be used therewith commercially. The effective and accurate life of gauges of this type has been relatively short because the commercially known conductive and insulating materials which might be used in forming such a gauge lack sufficient durability and resistance to abrasion to withstand the wear to which they are subjected in service.

An object of the invention is to provide an accurate and wear resisting plug gauge for testing electrical apparatus.

With this and other objects in view the invention comprises primarily a gauge having an electrical conductor element of predetermined hardness and an insulator therefor of substantially equal hardness. Specifically, the invention comprises a gauge of the plug type for gauging spring jacks with conductive rings for electrically contacting the springs of the jacks and insulating sleeves formed of hard surfaced materials disposed on each side of the conductive rings.

Other objects of the invention will be apparent from the following detailed description when taken in conjunction with the accompanying drawing, wherein Fig. 1 is a side elevational view of a gauge embodying the invention, shown associated with a spring jack, and Fig. 2 is an enlarged sectional fragmentary view of the gauge, with portions thereof shown in elevation.

Referring now to the drawing, numeral 10 designates a shank axially apertured at 11 to receive one end of a pin 12, the opposite end of the pin having integral therewith a tip 13, larger in diameter than the pin, to form a shoulder 14. Adjacent one end of the shank 10 is an enlarged portion 18 forming an abutting shoulder 19 for a purpose hereinafter described. A threaded projection 21 integral with the portion 18 and extending axially therefrom receives a disk-shaped guard 22 and a handle 23. The portion of the shank 10 adjacent the end which is opposite the enlarged portion 18 is bevelled as at 25 away from the end surface 26.

Positioned between the shoulder 14 of the tip and the surface 26 of the shank, and mounted upon the pin 12, are conductor rings 30 and 31 separated from each other by an insulating sleeve 32 and from the shoulder 14 and the surface 26 by insulating sleeves or rings 33 and 34. This assemblage of the rings 30 and 31 and the sleeves 32, 33 and 34 brings about an interrupted conductive surface but the rings are electrically associated with the shank 10 through the pin 11. In the present embodiment, the sleeve 33, the ring 30, and the adjacent portion 36 of the sleeve 32 have diameters equal to the diameter of the surface 14 on the tip 13. The portion 36 of the sleeve 32 has its periphery joined to the periphery of the remaining portion 37 of the sleeve through a bevelled portion 35 having an angle of approximately 45°. The diameter of portion 37 of the sleeve 32, the diameter of the ring 31, and the diameter of the sleeve 34 are all equal, but greater than the diameter of the surface 26.

Jack springs of the type as indicated at 40 and 41 (Fig. 1) have their ends formed substantially V-shaped, the apices thereof forming the contact points or edges. Gauge plugs of this type are used to determine whether or not the contact points of the springs are positioned properly relative to each other and relative to the outer surface 42 of a panel 43 containing a metallic sleeve 44 which is included with the springs in the electrical circuits. The spring 41 serves to actuate a make contact 48 when moved a desired distance, this movement being caused by the portion 35 of the gauge. The springs 40 and 41 must have sufficient resiliency and durability to assure long life thereof, but such resiliency and durability of the springs are apt to cause wear on a gauge plug which is used repeatedly for making such tests. When the commercially known types of insulating material have been used for the sleeves in a gauge of this type to separate the conductive rings from each other and from the tip and the shank, variations in the materials caused by changes in temperature or humidity and from other causes affect the gauge so that its efficient life is relatively short.

For the purpose of illustration, fibre and rubber, when used as insulators, are affected by humidity changes and may either decrease or increase in diameter due to such changes, such variation render the gauge ineffective to give accurate readings during a test for the following reasons: First, if the insulating sleeve should decrease in diameter the portions of the contact springs in advance of the contact points would contact with the respective rings whereas only the contact points should engage the rings; second, if the insulating sleeve should swell they would delay the engagement of the contact points with the rings; and third, if the sleeve should decrease in diameter the sharp edges of the rings would scrape off particles of metal from the springs which would adhere to the outer surfaces of the sleeves adjacent the conductive rings to widen their spring engaging areas and thus further rendering the gauge plug inefficient for the purpose intended.

When other insulating materials, such as Bakelite, bone, ivory and also various plastics are used for these sleeves it has been the tendency of such materials, when subjected to the scraping action of the springs, to wear in such a manner that some of the materials is scraped off by the springs and deposited upon the outer surfaces of the conductive rings, rendering them ineffective to accurately gauge the switches. Furthermore, when such materials wear away, inaccurate readings may result from the variations in diameters of the insulating material.

To overcome these disadvantages and to produce a gauge which will not only resist wear but will be substantially unaffected by changes in temperature, humidity, etc. and will thus remain accurate and dependable almost indefinitely, a conductive material for the rings 30 and 31 and an insulating material for the sleeves 32, 33 and 34 have been selected which are substantially equal in degree of hardness. For example, the sleeves 32, 33 and 34 may be formed from one of the following insulating materials, which are considerably harder than the aforementioned commercially known insulating materials and may be termed "hard surfaced material," the degrees of approximate hardness measured by Mohs' scale of hardness being given for each material:

| | |
|---|---|
| Scapolite | 5 |
| Feldspar | 6 |
| Glass | 6+ |
| Quartz | 7 |
| Zircon | 7 |
| Tourmaline | 7 |
| Almandite garnet | 7+ |
| Cordierite | 7+ |
| Euclasite | 7+ |
| Staurolite | 7+ |
| Beryl | 8 |
| Spinel | 8 |
| Topaz | 8 |

The conductor rings are formed of suitable steels, preferably tool steels which may vary in hardness from 5 to 8.5 as measured by Mohs' scale. Therefore, the conductor rings may be formed of steel comparable in hardness to a selected insulating material falling within that range to form a gauge having conductive and insulating materials of substantially equal hardness.

The tip 13 and the shank 10 are formed of suitable metals to render them wear resisting and to further aid in rendering them such they may be chromium plated.

The gauge is constructed so that the dimension between the shoulder 19 and the nearest edges of the rings 30 and 31 will be within predetermined limits less than those required for the commercial plug. The same is true of the dimensions of the width of the conductor rings and the distance between these rings. Consequently, if the circuit or circuits including the springs 40 and 41 and the sleeve 44 are closed when the gauge plug is inserted in place, it will be assured that the relative positions of the springs and the sleeve will be proper for the commercial type plug.

The disk-shaped guard 22, which may be formed of any suitable material such as fibre, serves to space the gauging end of the plug from contact with objects when not in use. The handle 23 is of sufficient size and weight to cause the entire unit to rest upon the disk and the outer portion of the handle when laid upon a support, thus protecting the outer end of the gauge plug.

The connection between the pin 12 and the apertured shank is shown as a press fit but these members may be provided with threaded connections, or secured by a suitable pin or in any other desired manner. Furthermore, the rings 30 and 31 and the sleeves 32, 33 and 34 may be formed with other than round cross sections if it is so desired.

Although the invention is herein disclosed as applied to use in connection with spring jacks, it is obviously not so limited but is applicable to other fields where electrical and physical tests are made. The invention is limited only by the spirit and scope of the appended claims.

What is claimed is:

1. In a gauge for testing the relative positions of spring contacts, a metal shank, electrical conductor elements carried by one end of the shank, insulating members carried by the shank and separating the elements from each other and the shank, a handle secured to the other end of the shank, and a guard for the elements and members disposed between the shank and the handle.

2. In a gauge for testing electrical apparatus, adjoining friction bearing surfaces of insulating and conductive materials having similar and high degree of hardness, the conductive material being steel.

3. In a gauge for testing electrical apparatus, adjoining friction bearing surfaces of insulating and conductive materials having similar and high degree of hardness, the conductive material being steel and the insulating material being selected from the group consisting of scapolite, feldspar, glass, quartz, zircon, tourmaline, almandite garnet, cordierite, euclasite, staurolite, beryl, spinel and topaz.

4. In a gauge for testing electrical apparatus, adjoining friction bearing surfaces of conductive and insulating materials, the conductive material being hardened steel and the insulating material having similar and high degree of surface hardness to form a continuous surface of equal hardness throughout.

5. In a gauge for testing electrical apparatus, adjoining friction bearing surfaces of conductive and insulating materials, the conductive material being hardened steel and the insulating material having similar and high degree of surface hardness to form a continuous surface of equal hardness throughout, the surface hardness of both materials being not less than five as measured by Mohs' scale of hardness.

RUDOLPH S. BRESCKA.
EDWARD J. MEAGHER.